Harlow Isbell. Meriden. Connecticut

Letters Patent.

The Schedule referred to in these Letters Patent and making part of the same, containing a description in the words of the said Harlow Isbell himself, of his improvements in wrought iron door-handles, commonly called Norfolk latches.

To all to whom these presents shall come.
Be it known, that I, Harlow Isbell of Meriden in the County of New Haven, State of Connecticut, a citizen of the United States, have invented, made and applied to use, a new and useful improvement in wrought iron door handles, of the shape usually called Norfolk Latches, which improvement I specify and describe as follows.

The annexed drawing exhibits an improved wrought iron door handle. The part a. a. shows that portion of the whole which may more appropriately be called the handle. The portion of it which is improved, lies between the curves at a. a.. It is obvious that if this whole handle was made in the shape as exhibited in the drawing by working in wrought iron it would require considerable labour and expense.

The middle part of the handle, or some portion thereof between a. a. also needs to be larger than the residue, to be convenient for use. The improvement therefore consists in obtaining the requisite size and shape of the said middle part of a wrought iron door handle at small expense. As also the shape may be varied at pleasure, the manufacturer can thereby, in a cheap manner

[illegible]

manner, combine utility with beauty.

The means of effecting this improvement is, to place the portion of the handle intended to be enlarged in a mould of metal, sand or other proper substance, fashioned according to the shape and size required, and then cast around the wrought iron any suitable metal, according to the usual mode of proceeding in similar cases.

I claim as my improvement, the addition of one or more enlarged parts to a common wrought iron door=handles by means of a Metallic substance cast around the same; and I claim nothing more.— In testimony that the foregoing is a true specification of my said improvement I have hereunto set my hand at Meriden the 11th day of September A.D. 1834.

Witnesses

Lyman Collins
Benajah Andrews

Harlow Isbell

396 ..8

(Patented November 8. 1834)

Drawing